D. F. McGOVERN.
POLISHING WHEEL.
APPLICATION FILED NOV. 3, 1919.
Reissued Dec. 6, 1921. 15,245.
FIG. I
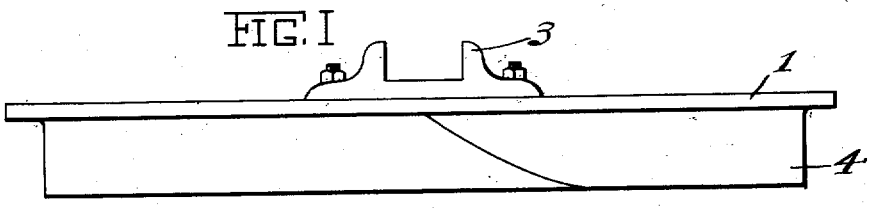
FIG. II
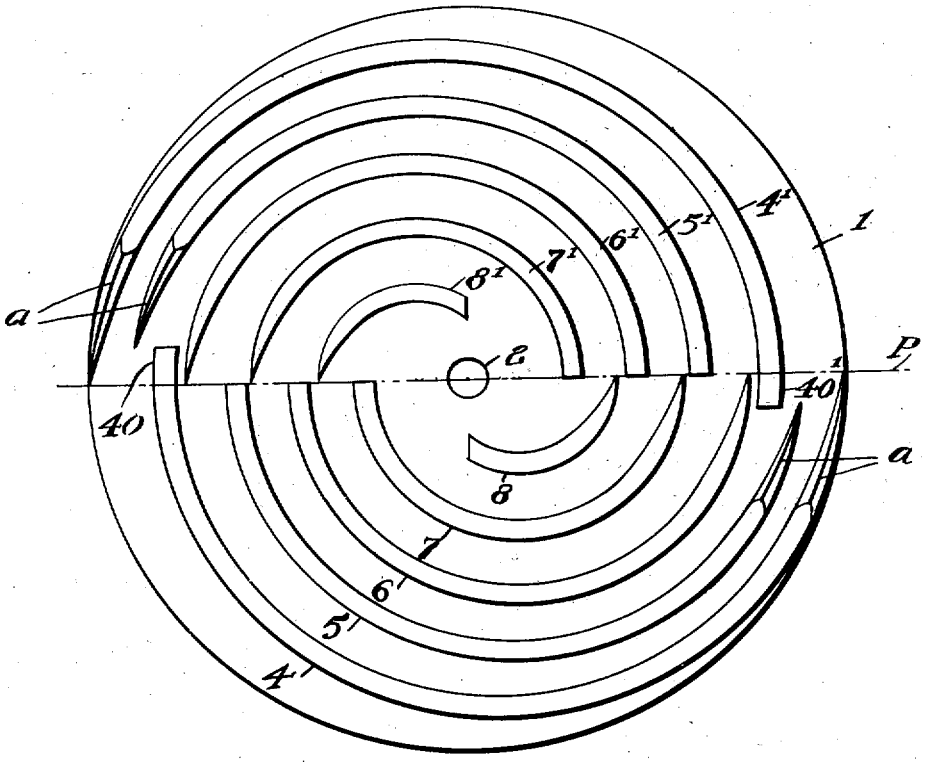
Inventor
Daniel F. McGovern
By Ellis Spear Jr.
Attorney

UNITED STATES PATENT OFFICE.

DANIEL FREDERICK McGOVERN, OF MONTPELIER, VERMONT.

POLISHING-WHEEL.

15,245. Specification of Reissued Letters Patent. Reissued Dec. 6, 1921.

Original No. 1,296,985, dated March 11, 1919, Serial No. 264,230, filed November 26, 1918. Application for reissue filed November 3, 1919. Serial No. 335,522.

*To all whom it may concern:*

Be it known that I, DANIEL F. McGOVERN, a citizen of the United States, residing at Montpelier, county of Washington, State of Vermont, have invented certain new and useful Improvements in Polishing-Wheels, of which the following is a specification.

This invention relates to polishing wheels, and particularly to a polishing or "ironing" wheel having scroll-shaped flanges between which abrasive is introduced and by which it is worked against the surface, usually granite, marble or other stone being polished.

In polishing stone, the process usually followed is to first point and build up the rough stone, after which the stone is smoothed or dressed, and is ready for the buffing or finishing step. For the first step an abrasive consisting of hard chilled-iron pellets or shot mixed with sand and wet with water is usually employed; for the second, the abrasive is usually comminuted carbolon, emery powder or similar finely divided substance; while for the third, a reversible felt buffer is used.

My polishing wheel is particularly intended for use in carrying out the first step of the usual polishing process, as distinguished from the second, and involves certain characteristic differences, owing to the difference in the abrasive material used in these steps.

The tendency of the heavy abrasive used in the roughing step is to clog the channels separating the flanges of the scroll, thus causing an unequal distribution of the abrasive, with resultant loss in efficiency. Moreover, the tendency of the abrasive to be thrown from under the wheel by the centrifugal force developed as the wheel rapidly rotates obstructs the even and progressive feed of the abrasive toward the center of the wheel. Certain difficulties are also experienced in securing a proper feeding-in of the abrasive, in preventing it from spilling out, and in securing a free working of the material between the flanges.

The object of my invention, generally stated, is to provide a polishing wheel in which the foregoing difficulties are overcome. This object, and certain other features of advantage which will appear more particularly hereinafter, are secured in the polishing wheel of the present invention. The construction and operation of my invention is disclosed in the following specification, and illustrated in the accompanying drawings, throughout which like reference characters are correspondingly employed.

In the drawings:

Figure I is a side elevation of a polishing wheel in accordance with my invention, and Fig. II is a bottom view thereof.

The polishing wheel selected as an illustrative embodiment of my invention has a lateral intake for the abrasive, as distinguished from those wheels in which the abrasive is fed in at the top of the wheel.

I have indicated at 1 a plate or disk forming the frame or body of the polishing wheel and having a central mud-discharge opening 2 and lugs 3 to receive the driving shaft.

My invention consists in the construction and arrangement of the scroll-shaped flanges between which the abrasive works.

According to the present invention, as illustrated herein, the flanges are disposed as double scrolls of progressively increasing length from the center toward and extending circularly about the wheel, as designated by the reference characters, 4, 5, 6, 7, anl 8, and $4^1$, $5^1$, $6^1$, $7^1$, and $8^1$, respectively.

Each flange is of substantially segmental form, and is preferably sharpened at its forward end, as indicated at *a*, to provide a runner. The curvature is such that the respective ends of the corresponding flanges are positioned at substantially the same distance from the center of the wheel, and with the exception of flanges 5 and $5^1$ the forward ends all terminating in substantially the same plane, indicated at P, Fig. II. The rear ends of flanges 4 and $4^1$ are extended somewhat and overlap the adjacent forward ends of flanges 6 and $6^1$, providing chokers 40 and $40^1$ overlapping the lateral intake openings for the abrasive and adapted to prevent the abrasive from spilling from the channels, without however impeding free intake of the abrasive. The forward ends of the flanges 5 and $5^1$ terminate short of the indicated plane P and are positioned closer to the flanges 4 and $4^1$, so that the intake channels for the abrasive are relatively narrow at the periphery of the disk and progressively increase in width as they approach the center. This arrangement also distributes the balance of the wheel somewhat toward its periphery. The segmental flanges thus provide varied intake openings with overlapping chokers 40 and $40^1$ adapted to catch and feed in the abrasive, while preventing the abrasive spilling out as the wheel rotates.

The flanges 5 and $5^1$ between the outer flanges 4 and $4^1$ and the inner flanges 6 and $6^1$, respectively, provide with said flanges 4 and $4^1$ and 6 and $6^1$, pairs of spaced abrasive intake channels at opposite sides of the disk, each pair of channels having a common peripheral intake opening, guarded as at 40 by the overlapped end of the flange 4 and $4^1$ of the opposite flange set.

Inasmuch as the flanges 5, $5^1$, 6, $6^1$, 7, $7^1$ and 8 and $8^1$, do not overlap each other, no obstruction is offered to the free working of the abrasive between the flanges.

The working face of the plate is thus provided with duplicate sets of symmetrically arranged segmental flanges having their leading enls disposed on opposite sides of the indicated plane P, and their centers relatively offset as to each other to bring the rear or tail ends of some of the flanges in radial proximity to the leading end of the next inner flange of the opposite set whereby to increase the inward trend of the channel between sequent flanges, as $5^1$, 7 and 5 and $7^1$, and to decrease the outward movement of the abrasive in passage from the flanges of one set to those of the opposite set.

Various modifications in the form and construction of my device may obviously be made, all without departing from the spirit of my invention if within the limits of the appended claims.

What I therefore claim and desire to secure by Letters Patent is:

1. A polishing wheel comprising a plate having on its working face duplicate sets of symmetrically arranged semicircular flanges disposed on opposite sides of a plane passing transversely of the plate, the rear end of the outermost flange of each set extending beyond said plane and overlapping the forward end of a flange of the opposite set and constituting a choker effective to prevent the abrasive spilling out.

2. A polishing wheel comprising a plate having on its working face duplicate sets of symmetrically arranged semicircular flanges disposed on opposite sides of a plane passing transversely of the plate, the rear end of the outermost flange of each set extending beyond said plane and overlapping the forward end of a flange of the opposite set and constituting a choker effective to prevent the abrasive spilling out, and the forward end of the flange next adjacent the choker flange of each set terminating short of the said plane and providing with the forward ends of the choker flanges abrasive intake openings at opposite edges of the plate.

3. A polishing wheel, comprising a plate having on its working face duplicate sets of symmetrically arranged segmental flanges having their centers relatively offset to each other, the forward ends of all flanges of each set, except the flange next adjacent the outermost flange of each set, terminating at opposite sides of a plane passing transversely of the plate, and the forward ends of said next adjacent flanges terminating short of said plane and providing opposed abrasive intake openings, said outermost flange and said next adjacent flange of each set defining a feed channel for the abrasive of progressively increasing width from the outer edge of the plate toward the center thereof, and the channels between the flanges of each set included within said next adjacent flange being substantially concentric.

4. A polishing wheel comprising a plate having on its working face duplicate sets of symmetrically arranged segmental flanges having sharpened leading ends disposed on opposite sides of a plane passing transversely across the plate, the centers of said sets being relatively offset to bring the tail ends of some of the flanges in radial proximity to the leading end of a flange of the opposite set whereby to increase the inward trend of the channel between sequent flanges and decrease the outward movement of the abrasive in passage from the flanges of one set to those of the other set.

5. In a polishing wheel, a plate having duplicate sets of substantially concentric flanges on its working face, the centers of said sets being relatively offset, and such flange set comprising at least three flanges, the outer and inner flanges of each set starting at a plane extending transversely of the plate and the intermediate flange starting in rear of said plane, and providing with said outer and inner flanges spaced abrasive channels having a common intake opening.

6. In a polishing wheel a plate having opposed sets of flanges on its working faces, each set including at least three flanges, the centers of said sets being relatively offset, and the outer and inner flanges of each set starting at a plane extending transversely of the plate and the intermediate flange of each set starting in rear of said plane and providing with said outer and inner flanges spaced abrasive channels having a common intake opening, the rear end of the outer flange of each set extending beyond said plane into the space between the forward ends of the intermediate and inner flanges of the opposite set and the rear ends of the intermediate and inner flanges of each set terminating at said plane.

7. A polishing wheel comprising a plate having on its working face duplicate sets of symmetrically arranged segmental flanges disposed on opposite sides of a plane passing transversely across the plate, each set having all of its flanges terminating substantially at said transverse plane except the second flange from the periphery which terminates short of said plane, the center of the two sets of flanges being relatively offset so that the rear end of the outside flange of each set comes between the forward ends of the second and third flange of the other set and is extended across said transverse plane to substantially abreast of the leading end of said second flange.

DANIEL FREDERICK McGOVERN.

Witnesses:

JOHN W. SARGENT,

IDA M. FULLER.